United States Patent
Dean et al.

(10) Patent No.: US 6,269,468 B1
(45) Date of Patent: Jul. 31, 2001

(54) SPLIT I/O CIRCUIT FOR PERFORMANCE OPTIMIZATION OF DIGITAL CIRCUITS

(75) Inventors: Alvar Dean, Essex Junction; Patrick E. Perry, Shelburne; Sebastian Ventrone, So. Burlington, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/260,453

(22) Filed: Mar. 2, 1999

(51) Int. Cl.[7] ..................................................... G06F 17/50
(52) U.S. Cl. ............................................................. 716/2
(58) Field of Search ..................... 716/2, 17, 18

(56) References Cited

U.S. PATENT DOCUMENTS

| | | | |
|---|---|---|---|
| 4,827,428 | 5/1989 | Dunlop et al. | 716/6 |
| 4,940,908 | 7/1990 | Tran | 326/17 |
| 5,003,487 | * 3/1991 | Drumm et al. | 716/18 |
| 5,319,646 | 6/1994 | Simpson et al. | 714/727 |
| 5,347,520 | 9/1994 | Simpson et al. | 714/727 |
| 5,517,132 | 5/1996 | Ohara | 326/41 |
| 5,787,011 | 7/1998 | Ko | 716/2 |
| 5,799,170 | * 8/1998 | Drumm et al. | 716/2 |
| 5,815,004 | 9/1998 | Trimberger et al. | 326/41 |
| 5,903,466 | * 5/1999 | Beausang et al. | 716/18 |
| 5,984,510 | * 11/1999 | Guruswamy et al. | 716/2 |

* cited by examiner

Primary Examiner—Trong Phan
(74) Attorney, Agent, or Firm—Scully, Scott, Murphy & Presser; Eugene I. Shkurko, Esq.

(57) ABSTRACT

A logic circuit device and circuit design methodology includes a "split-book" logic circuit design having different active device sizes with outputs for connections to both critical and non-critical digital circuit paths. By using "split" book designs with separate input and output stages, better silicon utilization, power optimization, and performance results. This is because each split book is designed with multiple output buffers that may be configured to optimally drive critical and non-critical paths. During the power/performance optimization phase of the design, timing critical paths of the design are first identified, with each path being optimized on its own basis. First the input stage of the strand may be improved with a stronger drive on the input port of the book. Only the input port that has been linked to a critical path is updated. The other input pins are left at their default setting. Then, the output buffers may then be connected together according to criticality of the path and net capacitive load they are driving. Different split book input/output circuit combinations may be attempted during the design phase until an optimal tradeoff between power optimization and performance is reached.

16 Claims, 7 Drawing Sheets

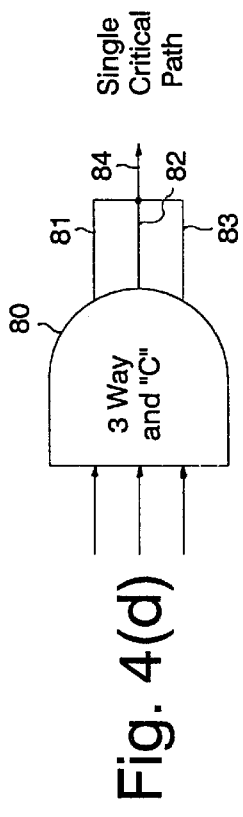
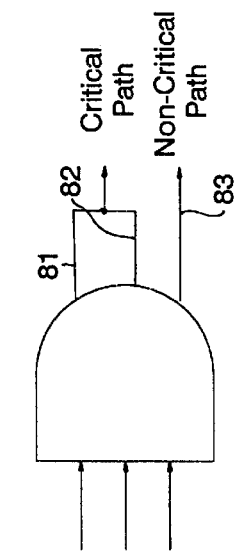
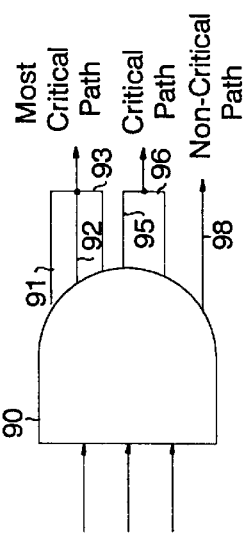
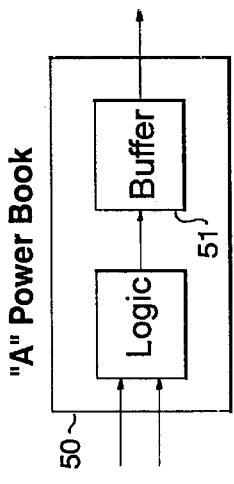
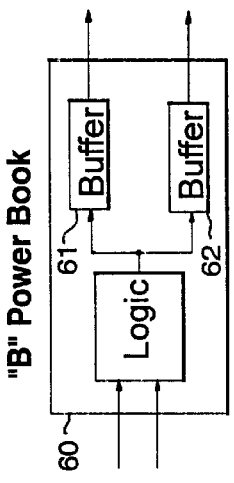
Fig. 4(a) Fig. 4(b) Fig. 4(c)
Fig. 4(d) Fig. 4(e) Fig. 4(f)

SPLIT I/O CIRCUIT FOR PERFORMANCE OPTIMIZATION OF DIGITAL CIRCUITS

FIELD OF THE INVENTION

The present invention relates to digital circuit design technology, and particularly to circuits and methods for reducing power in and optimizing performance of digital/logic circuits.

BACKGROUND OF THE INVENTION

In current digital circuit designs, for example, in ASIC and programmable gate array designs, power and timing optimization is done on a per path basis. Standard techniques involve 1) changing the circuit power level, i.e., implementing higher (faster) or lower power versions of the same book (logic gate(s)) to meet the timing requirement of a critical path; 2) repower, either serially with a repowering tree, or in parallel by cloning or duplicating a path to speed up the critical nets. As a consequence of these methods, unnecessary loading of noncritical nets occur resulting in wasted AC power. In addition, increased wire congestion can occur as the number of books that the input nets have to fan out to doubles/triples to meet the performance paths.

With more particularity, FIG. 1a shows a logic network 10 having a timing critical path starting at primary input pin C of NAND gate 1 going to input pin A of NAND gate 2, and on to the critical output 15 of NAND gate 2. Assume that all other paths 16–20 are non-timing critical. Thus, FIG. 1a illustrates the very common occurrence of critical timing paths crossing non-critical timing paths on a logic network. There are three ways to correct the timing problems in this network: 1) increase NAND 1 to the highest power level required to correct the problem. If this can correct the timing problem, it will, at the very least, increase the power of the non-critical path through input pin A of NAND 1; 2) if increasing the power level of the circuit does not solve the timing problem then: a) either serial repowering comprising the addition of a serial buffer 21 to the book of FIG. 1a, as shown in FIG. 1b; or, b) parallel repowering comprising the addition of logic NAND gate 23 duplicate of logic NAND gate 1 and connected in parallel with the original NAND gate 1, as shown in FIG. 1c. In both cases, power consumption, as well as wiring congestion, is increased by adding books. Thus, those non-critical paths 16–20 that cross critical paths are not power-optimized. This is because in order to obtain an optimal performance/power solution, the non-critical capacitance must be eliminated from the critical path to speed it up without increasing overall capacitance. FIG. 1(b) only provides partial isolation of the critical capacitance $C_{crit}$ from the non-critical capacitance $C_{non-crit}$ since gate 1 still sees the load of the buffer. FIG. 1(c) doubles the input capacitance of both the critical and non-critical paths, as well as increasing the area and wiring congestion.

Prior art techniques for optimizing (critical path) performance in such circuit designs may be found and described in U.S. Pat. No. 4,827,428 which describes a transistor sizing system for improving the design of integrated circuits; U.S. Pat. No. 4,940,908 which describes a technique for reducing critical speed path delays in binary logic circuits by implementing "multiplexing logic", U.S. Pat. No. 5,815,004 which teaches a FPGA having independently buffered output lines of a configurable logic block for handling critical path situations; U.S. Pat. No. 5,517,132 which teaches a logic synthesis method utilizing two voltages, a higher voltage for driving critical paths and lower level voltages for driving non-critical paths, in an effort to reduce power consumption of integrated circuits; and, U.S. Pat. No. 5,787,011 which teaches a technique implementing complementary passage logic (CPL) technology using low power circuits for non-critical circuits and higher power circuits for critical paths. While effective for their respective purposes, it still remains the case that non-critical paths that cross critical paths cannot be power-optimized.

As shown in FIG. 2, the basic problem with traditional libraries is that a traditional book 25 comprising a logic stage 27 for receiving input signals and implementing logic, and a single output buffer stage 29 having a single output for driving fanout circuits is designed for a given power level. Moreover, these book designs assume that both inputs are equally critical and all output sinks are also critical paths. As shown in FIG. 1(a), however, this is simply not the case.

What is required is a book design technique that can simultaneously support a critical high-performance/high-power path, and a non-critical low-power path, thus allowing simultaneous optimization of both power and performance.

SUMMARY OF THE INVENTION

The present invention is directed to a "split-book" logic circuit design having different active device sizes with outputs for connections to both critical and non-critical digital circuit paths. By using the "split" books designs with separate input and output stages, better silicon utilization, power optimization, and performance results. This is because each split book is designed with multiple output buffers that may be configured to optimally drive critical and non-critical paths. During the power/performance optimization phase of the design, timing critical paths of the design are first identified, with each path being optimized on its own basis. First the input stage of the timing critical path may be improved with a stronger drive on the input port of the book. Only the input port that has been linked to a critical path is updated. The other input pins are left at their default setting. Then, the output buffers may then be connected together according to criticality of the path and net capacitive load they are driving. Different split book input/output circuit combinations may be attempted during the design phase until an optimal tradeoff between power optimization and performance is reached.

According to the principles of the invention, there is provided: 1) a method of optimizing a design of a circuit, the method comprising the steps of identifying a circuit element that drives both a critical circuit path and a non-critical circuit path, which critical path fails a timing requirement of the circuit, and replacing the circuit element with a split I/O circuit; and 2) a split I/O circuit comprising a logic stage for receiving input signals and performing a logic evaluation in response to the input signals, an output stage coupled to the logic stage and to a plurality of outputs for driving a results of the logic evaluation therethrough, the outputs coupled to circuit paths having varying levels of criticality and load magnitudes, and wherein the output stage includes a plurality of driving circuits selectively coupled together to simultaneously drive an individual output based on a criticality level of a circuit path coupled to the individual output and on a load magnitude of the individual output.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIGS. 4(a)–4(c) illustrates various split I/O circuit implementations such as found in a split I/O logic library database;

FIGS. 4(d)–4(f) illustrates example possible split I/O circuit implementations for split I/O circuits included in the split I/O logic library database;

DETAILED DESCRIPTION OF THE PREFERRED EMBODIMENTS

Figure 3A:
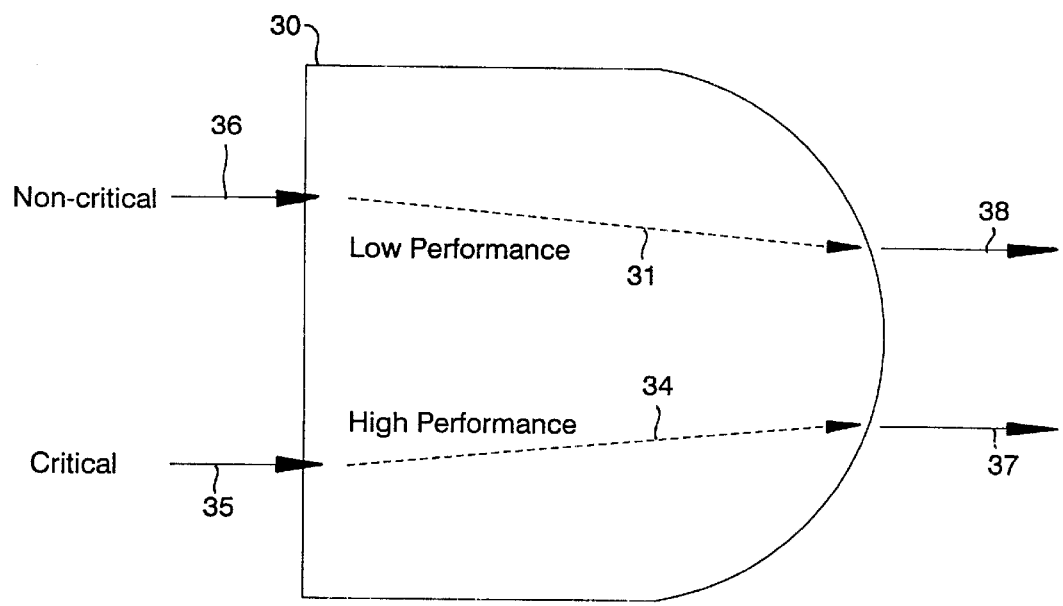
FIG. 3(a) depicts the split I/O circuit element of the invention.

FIG. 3(a) illustrates conceptually the split-I/O circuit of the invention. As shown in FIG. 3, a book 30 is designed to have a set low-power input and output pins, 36, 38 respectively, and, a set high-performance input and output pins 35, 37 respectively, with each having minimal impact on each other. As will be described in further detail, the critical input and output stages are built with larger devices, while the non-critical input and output stages are much smaller, thus saving power. The book can be thought of as having two strands or path segments, a low power one and a high performance one. Specifically, in FIG. 3(a), the primary functional components of the improved split-circuit I/O design 30 according to the first embodiment of the invention, includes a lower power segment 31, and a high performance segment 34. According to the book of the invention, only the critical path(s) 35 will receive the optimization with the non-critical path(s) 36 remaining at the lower power/area setting.

Figure 3B:
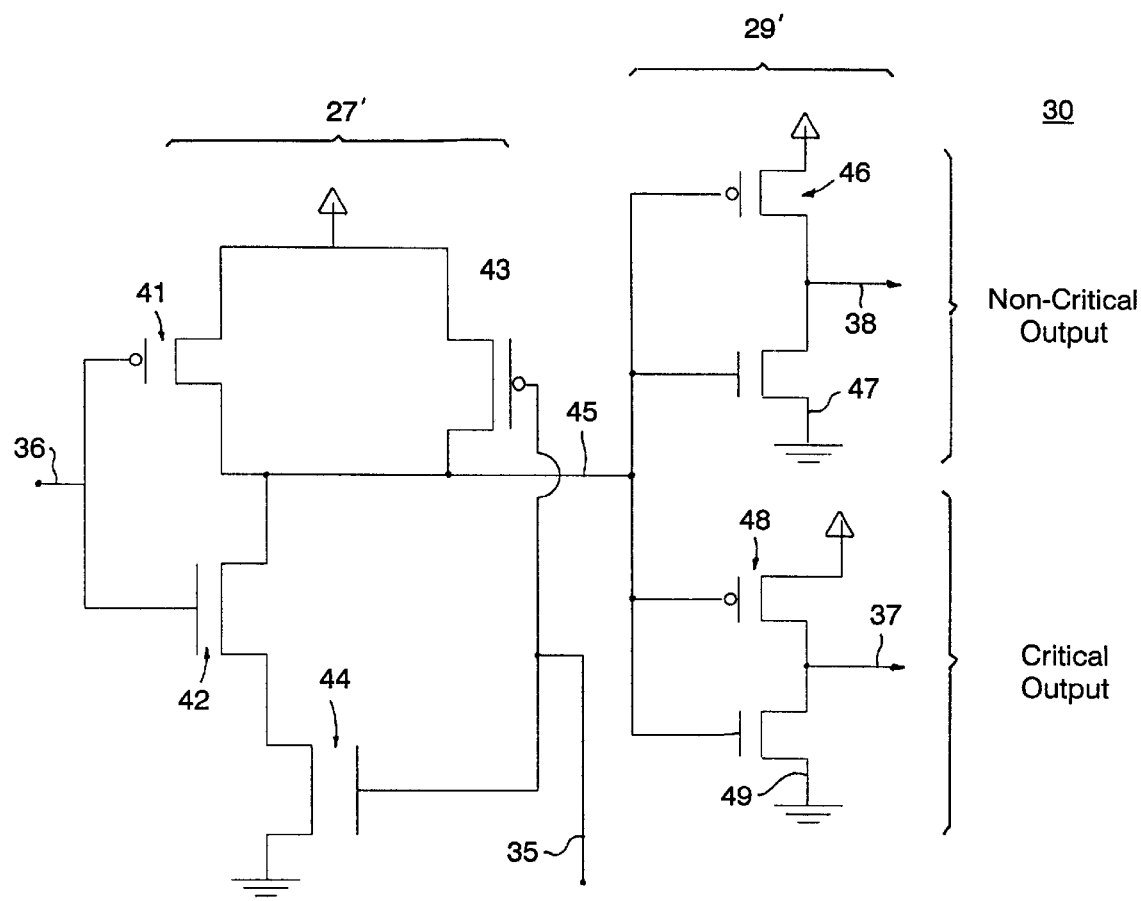
FIGS. 3(b) and 3(c) illustrate example base circuit compositions of the split I/O circuit element of FIG. 3(a)

FIG. 3(b) is a detailed circuit diagram of one implementation of the split-I/O book (AND gate) 30 of FIG. 3(a). As shown in FIG. 3(b), a logic input stage 27' comprises two sets of transistors: a first set comprising a CMOS-P transistor 41 and a CMOS-N transistor 42 for receiving a non-critical logic input 36 of a non-critical path of an ASIC circuit; and, a second set comprising a larger transistor 43 (e.g., CMOS-P) and a transistor 44 (e.g., CMOS-N) for receiving critical logic input 35 of a critical path of a ASIC circuit. Output of this logic stage is a logic signal illustrated as line 45 feeding a novel buffering stage 29'. As further shown in FIG. 3(b), the buffering stage 29' comprises two sets of transistors: a first set comprising relatively small transistors 46 (e.g., CMOS-P) and 47 (e.g., CMOS-N) for buffering the signal output 45 when driving a non-critical path of the ASIC circuit; and, a second set comprising relatively larger transistors 48 (e.g., CMOS-P) and 49 (e.g., CMOS-N) for buffering the signal output 45 when driving a critical path of the ASIC circuit. It should be understood that implementation of various size devices for the input logic and output buffering stages, as illustrated in FIG. 3(b), may be used in many types of logic devices, e.g., OR, XOR gates.

Figure 3C:
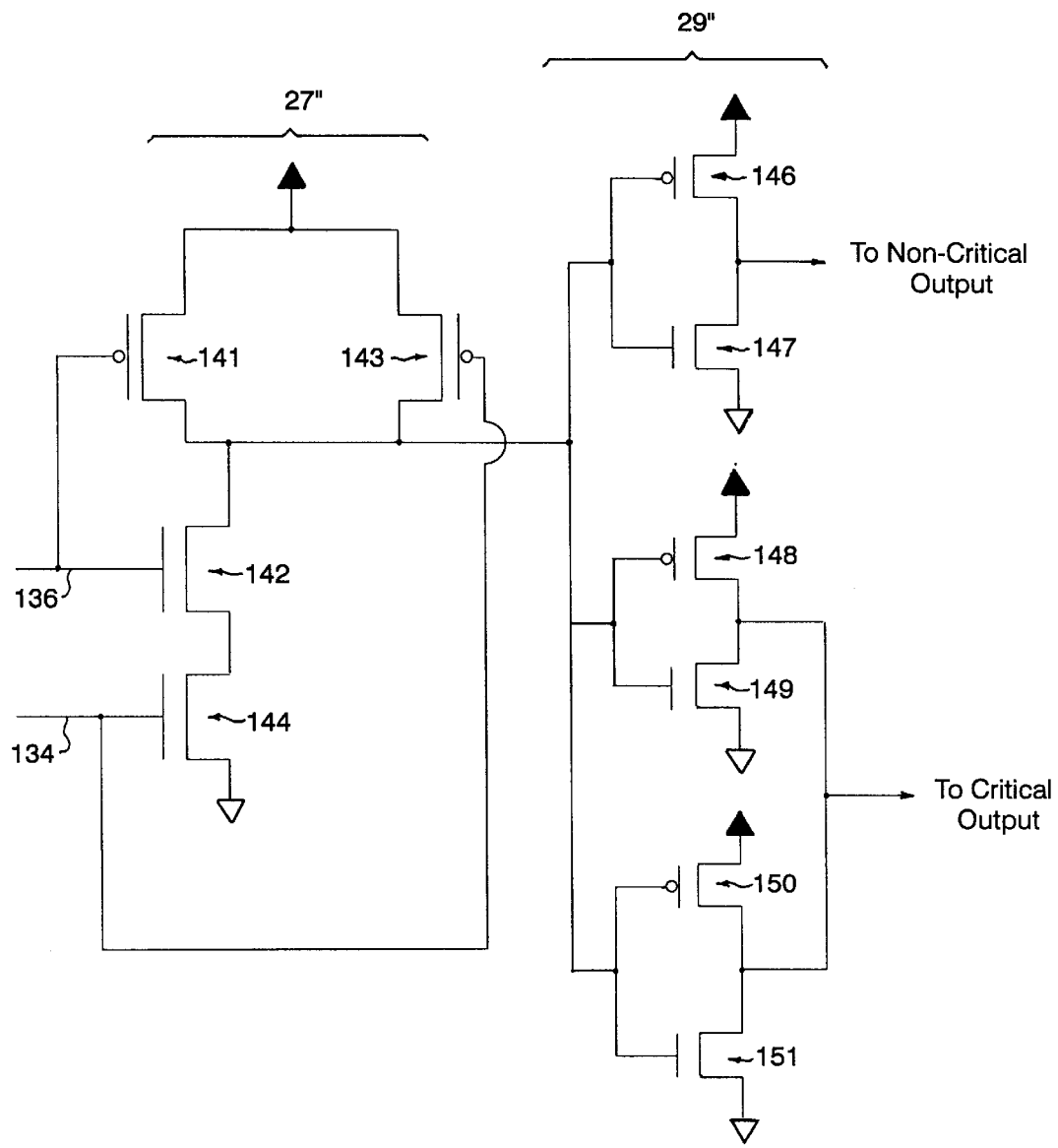

According to a preferred embodiment, as shown in FIG. 3(c), both input (logic) and output (buffer) stages may be implemented with multiple equally-sized devices. Particularly, in FIG. 3(c), for the input logic stage 27", transistor devices 141–144 are of equal size with transistor combination 141 and 142 receiving a non-critical path logic input 136 and transistor combination 143 and 144 receiving critical logic input 134 of a critical path of a ASIC circuit. For the output logic stage 29", devices 146–151 are of equal size and configured in 10 parallel. As will be explained in greater detail with respect to FIGS. 4(a)–4(f), one or more of the parallel buffer stage outputs may be connected together depending upon the criticality of the path they are driving. It should be understood that various combinations of split I/O circuits may be devised, for example, an input logic stage having input devices of unequal size, and output buffer devices being of equal size.

Figure 1A:
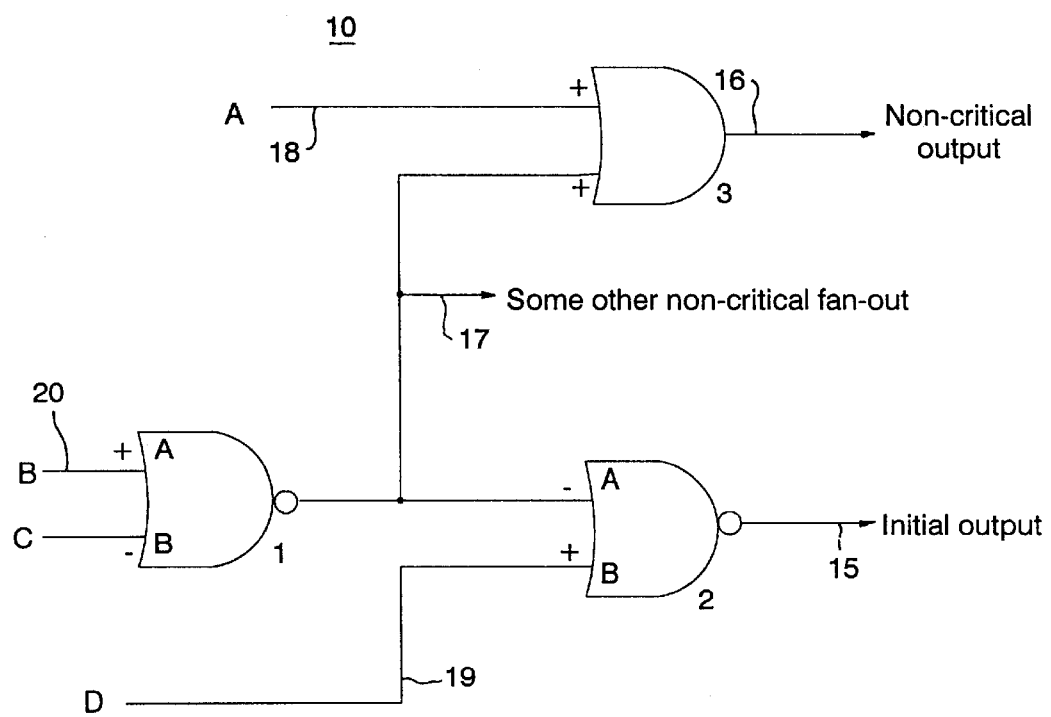
FIG. 1a illustrates a logic circuit having critical and non-critical paths.
Figure 1B:
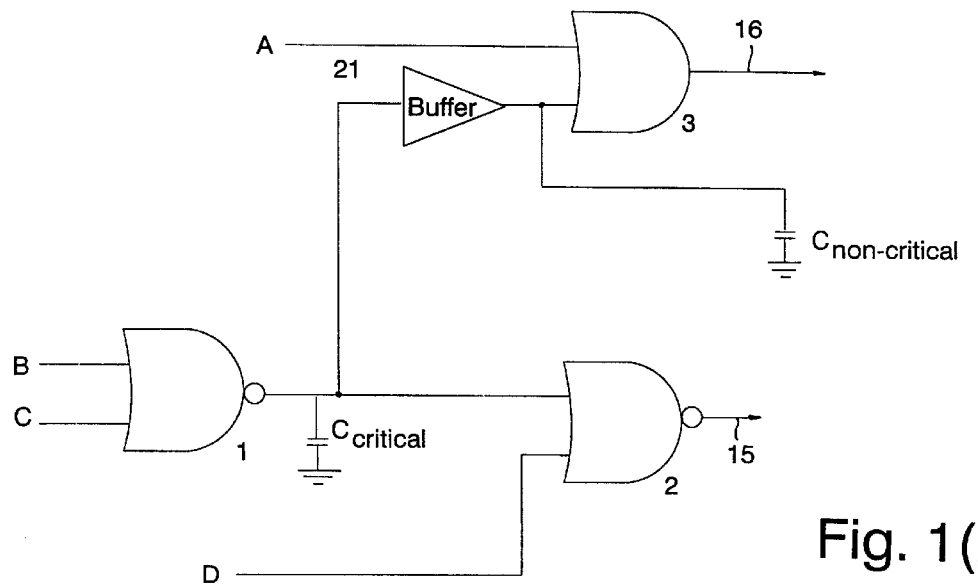
FIG.1b illustrates a serial repowering methodology for improving ASIC performance (in the circuit of FIG. 1a)
Figure 1C:
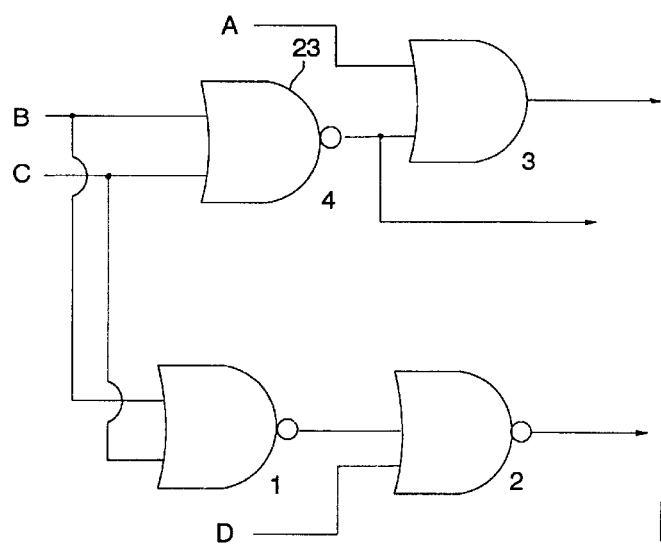
FIG. 1c illustrates a parallel repowering methodology for improving ASIC performance (in the circuit of FIG. 1a)
Figure 2:
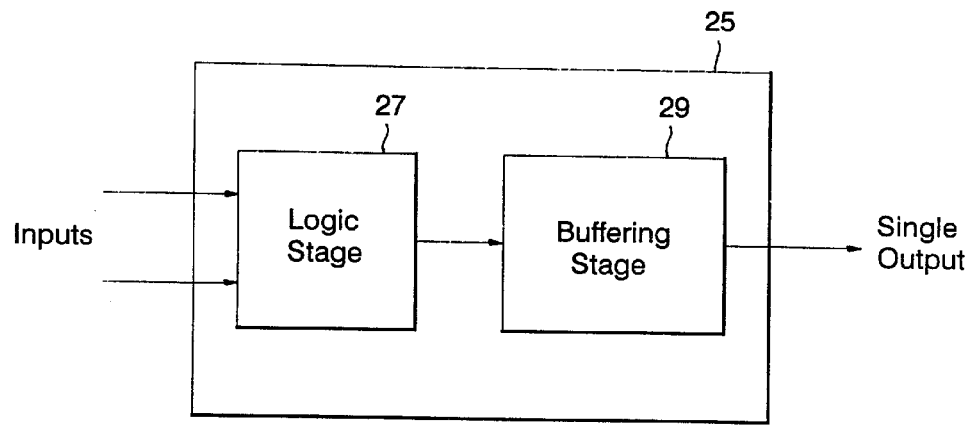
FIG. 2 illustrates a block diagram of the traditional book design.

While the split output may look like a serial repowering case of FIG. 1(b) with the buffer located in the book itself, instead of externally, a key benefit is provided in this split I/O book since the external buffer has a larger input capacitance from globally routing the net to it. By splitting the critical and non-critical buffers internally, overall switched capacitance is reduced, thus reducing power and resulting in a faster circuit. These transistors may be fabricated using well-known techniques, and may comprise for instance, bi-polar transistors, or other types of microelectronic transistor technology.

According to the invention, for a given book design, the number of buffer stages may increase, and a whole library of split I/O circuits may be fabricated, an example portion of which is shown in FIGS. 4(a)–4(c). For example, FIG. 4(a) illustrates a split I/O book design 50 having a single buffer stage 51 for a single low power output(non-critical path). FIG. 4(b) illustrates an example split I/O book design 60 having a dual buffer output stage with a first buffer 62 having an output for connection to non-critical paths, and a second buffer 63 having an output for connection to another critical path. FIG. 4(c) illustrates a split I/O book design 70 having three buffers 72,74,76 connected in parallel. In such circuits, it may be assumed that each of the output buffers comprises transistors of like sizes and thus, are individually rated for driving circuits of equal power. However, this is not necessarily the case and the output buffers may be rated at different power levels.

It should be understood that a library implementation not only comprises the split I/O book designs of FIGS. 4(a)–4(c) but would include many other logic circuits (OR, XOR, NAND, etc.) accommodating single or multiple inputs, and having one or more parallel-connected buffers at an output stage for accommodating one or many output lines. One or more of these output lines may be connected together, using conventional techniques, for driving critical circuit paths. As an example, FIG. 4(d) illustrates an example use of a 3-way AND book 80 having three buffers for providing three output signals 81–83. In accordance with the invention, all three of these outputs may be connected together to form a single output 84 for driving a single critical path of an ASIC circuit, for example. In another example, as shown in FIG. 4(e), two of the three outputs 81, 82 at the output buffer stage may be connected as shown for driving a critical path circuit, while the remaining output 83, may be connected to a non-critical circuit path to save power. As another example, FIG. 4(f) illustrates a possible use of a book design 90 having three input and six output buffers for driving six output lines. Such a book may be used for instance, to drive several circuit paths of varying degrees of criticality: for example, three outputs 91–93 may be connected together for driving a circuit along a most critical path; two outputs 95–96 may be connected together for driving a circuit along a next critical path; and a remaining output 98 may be connected for driving the non-critical path of a circuit. It should be understood that the possible uses for library implementations of the split I/O circuit are not limited to the usages shown in FIGS. 4(*d*)–4(*f*), and that outputs of the split I/O circuits may be connected in a variety of ways to accommodate the particular performance of the required paths.

Figure 5:
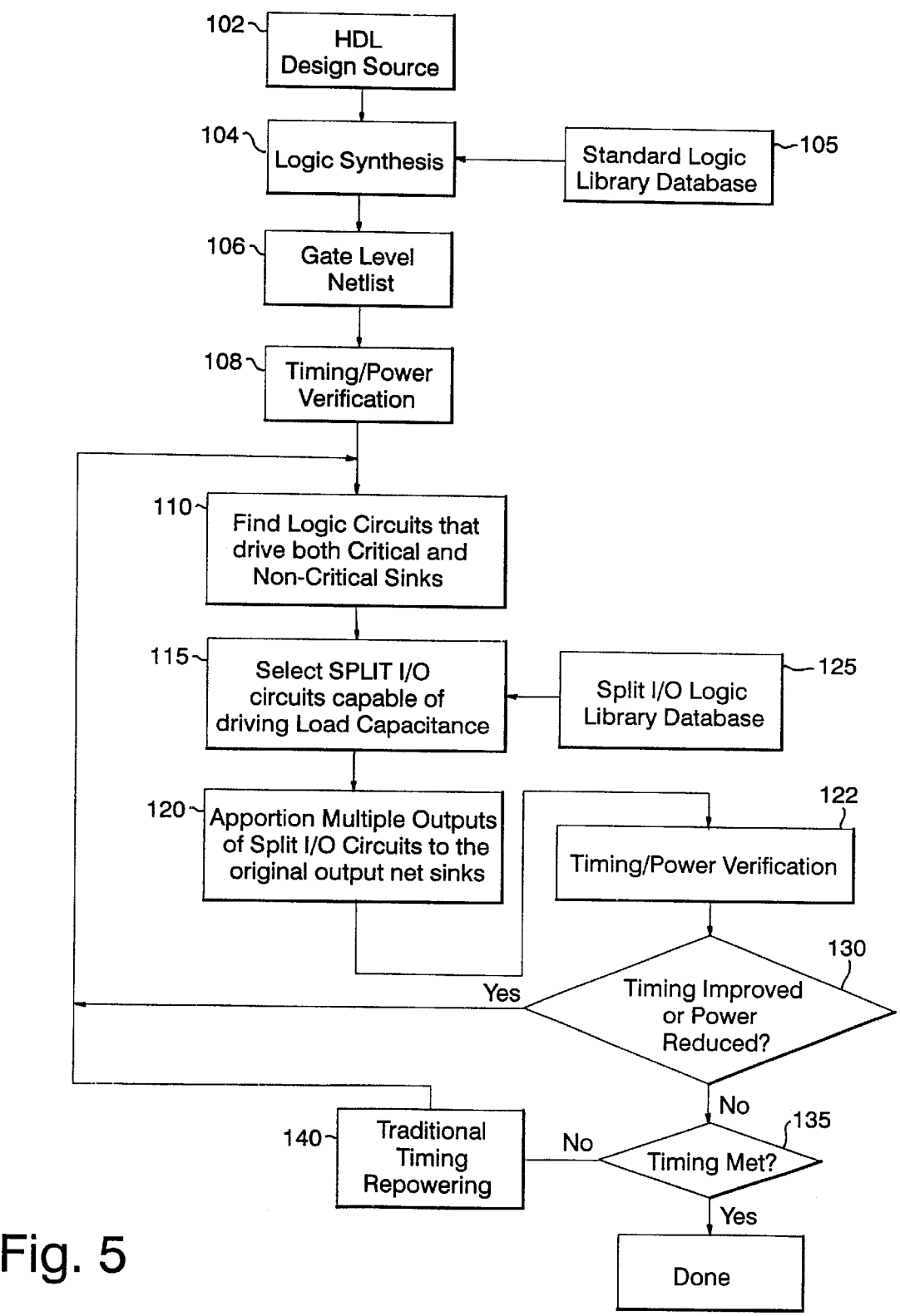
FIG. 5 illustrates a process flow depicting a methodology for implementing the split I/O circuit design according to the invention.

FIG. 5 illustrates the circuit design methodology 100 of the invention. At step 102, the traditional high-level definition language (HDL) net list is utilized to describe the circuit, e.g. ASIC, FPGA, to be designed. Then, step 104 indicates a logic synthesis step which includes referencing a standard logic library database 105 to define the gates to be used in the circuit design. The standard logic library comprises various logic circuits such as those described in the book "IBM ASIC SA-12 Databook," second edition, Jan. 1998 published by the IBM microelectronics division. Step 106 represents procurement of the logic circuit netlist, i.e., the logic gates and interconnects of the circuit design. Next, at step 108, well known synthesis tools are implemented to verify timing and power consumption, i.e., performance, of the designed circuit. This may be accomplished with tools such as IBM's Einstimer Static Timer and the PowerCalc Power Calculator (IBM publication). Thus, after implementing a traditional gate in a circuit design, if it is determined that the timing of the circuit is not met (step 108), then the gate may be replaced with a split I/O version of the gate with dedicated output drivers optimized across the critical paths.

More specifically, step 110 of FIG. 5 indicates the determination of those logic circuits, i.e., gates, in the circuit design, that drive both critical and non-critical sinks. Step 115 indicates the step of referring to a split I/O logic library 125, such as the example library of FIGS. 4(*a*)–4(*c*) to select the split I/O circuits capable of driving the various load capacitances for the non-optimized gates of the designed circuit. Next, at step 120, the multiple outputs of the split I/O circuits are apportioned to the original output net sinks. The apportionment of the split I/O circuit outputs to the respective output nodes is based on a combination of their capacitive loads and their criticality. First, the sinks are broken up into critical and non-critical sink groups. Each group's capacitance is summed up and the output sinks are assigned according to the percent (%) of the total net capacitance that each group has. It should be understood that in the split I/O designs of FIGS. 4(*a*)–4(*c*), the input wiring remains the same. In this manner, the gates design is optimized to correspond exactly to the use of the device within the given design. Only the critical paths receive the optimization with the non-critical paths remaining at their lowest power/area setting. Actual area growth is kept to the minimum, since the tuning of the design is based on only those paths that are critical, with no carry over effect to the non-critical paths. Next, at step 122, design tools (such as the tools described with respect to step 108) are again implemented for timing and power verification.

At step 130, a determination is made as to whether the timing and power consumption, i.e., performance, of the designed circuit has improved due to the split I/O circuit design modifications. If the timing has improved and the power is reduced, then the next iteration is performed to find other logic circuits that may drive both critical and non critical sinks by repeating steps 110 to 130 of FIG. 5. When it is finally determined that timing is no longer improved or power cannot be further reduced, then the process proceeds to step 135 to determine if the timing requirements for the circuit are met. If the timings are still not met, a pass of traditional repowering is performed as indicated at step 140 where traditional repowering methods (such as serial repowering or parallel repowering (cloning)) are implemented to improve the timing. The split I/o timing/power optimizations are again repeated by returning to step 110 where the next iteration is performed to find other logic circuits that may drive both critical and non critical sinks as indicated by repeating steps 110 to 130 of FIG. 5.

If, at step 135 it is determined that the timing requirements are met, the process is completed.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for optimizing a design of a circuit, the method comprising the steps of:
   a) identifying a circuit element that drives both a critical circuit path and a non-critical circuit path, which critical path fails a timing requirement of the circuit,
   b) replacing the circuit element with a split I/O circuit, said split I/O circuit comprising:
      i) a logic stage for receiving input signals and performing a logic evaluation in response to the input signals; and,
      ii) an output stage coupled to the logic stage and to a plurality of outputs for driving a results of the logic evaluation therethrough, the outputs coupled to circuit paths having varying levels of criticality and load magnitudes, and wherein the output stage includes a plurality of drive circuits; and,
   c) selectively coupling together one or more of said plurality of drive circuits to simultaneously drive an output net sink based on a criticality level of a circuit path coupled to the individual output sink and on a load magnitude of the output sink.

2. The method as claimed in claim 1, further comprising the step of:
   d) verifying timing of circuit along a critical path; and,
   e) repeating steps a)–d) until circuit timing limitations are met.

3. The method as claimed in claim 2, further comprising the step of:
   e) verifying power consumption of circuit along a critical path; and,
   f) repeating steps a)–e) until circuit power consumption limitations are met.

4. The method as claimed in claim 1, wherein said output stage comprises drive circuits of substantially equivalent driving capability.

5. The method as claimed in claim 1, wherein said output stage comprises drive circuits of substantially equivalent size.

6. The method as claimed in claim 1, wherein said replacing step b) includes the step of: consulting a split I/O logic library storage device prior to said replacing, said split I/O logic library storage device comprising library of split I/O circuits capable of driving outputs having various degrees of criticality.

7. The method as claimed in claim 1, wherein said selectively coupling step c) further comprises the steps of:

partitioning said output net sinks into critical and non-critical sink groups;

summing each group's capacitive load and determining a total net capacitive load thereof; and, apportioning said driving circuits of said split I/O circuit according to a percent of said total net capacitive load for each sink group.

8. A split I/O circuit comprising:

a logic stage for receiving input signals and performing a logic evaluation in response to the input signals, an output stage coupled to the logic stage and to a plurality of outputs for driving a results of the logic evaluation therethrough, the outputs coupled to circuit paths having varying levels of criticality and load magnitudes, and wherein the output stage includes a plurality of drive circuits selectively coupled together to simultaneously drive an individual output based on a criticality level of a circuit path coupled to the individual output and on a load magnitude of the individual output.

9. The split I/O circuit as claimed in claim 8, wherein said output stage comprises drive circuits of substantially equivalent driving capability.

10. The split I/O circuit as claimed in claim 8, wherein said output stage comprises drive circuits of substantially equivalent size.

11. The split I/O circuit as claimed in claim 8, wherein said output stage comprises one or more driving circuits of a first load driving ability for driving non-critical path loads, and one or more driving circuits of a second load driving ability for driving critical path loads, said one or more driving circuits of a second load driving ability being larger than drive circuits of said first load driving ability.

12. A program storage device readable by a machine, tangibly embodying a program of instructions executable by the machine to perform method steps for automatically optimizing a design of a circuit, said method steps comprising:

a) identifying a circuit element that drives both a critical circuit path and a non-critical circuit path, which critical path fails a timing requirement of the circuit, b) replacing the circuit element with a split I/O circuit, said split I/O circuit comprising:

i) a logic stage for receiving input signals and performing a logic evaluation in response to the input signals; and, ii) an output stage coupled to the logic stage and to a plurality of outputs for driving a results of the logic evaluation therethrough, the outputs coupled to circuit paths having varying levels of criticality and load magnitudes, and wherein the output stage includes a plurality of driving circuits; and, c) selectively coupling together one or more of said plurality of driving circuits to simultaneously drive an output net sink based on a criticality level of a circuit path coupled to the individual output sink and on a load magnitude of the output sink.

13. The program storage device readable by a machine as claimed in claim 12, said method steps further comprising:

d) verifying timing of circuit along a critical path; and, e) repeating steps a)–d) until circuit timing limitations are met.

14. The program storage device readable by a machine as claimed in claim 12, said method steps further comprising:

e) verifying power consumption of circuit along a critical path; and, f) repeating steps a)–e) until circuit power consumption limitations are met.

15. The program storage device readable by a machine as claimed in claim 12, wherein said replacing step b) includes the step of: consulting a split I/O logic library storage device prior to said replacing, said split I/O logic library storage device comprising library of split I/O circuits capable of driving outputs having various degrees of criticality.

16. The program storage device readable by a machine as claimed in claim 12, wherein said selectively coupling step c) further comprises the steps of:

partitioning said output net sinks into critical and non-critical sink groups;

summing each group's capacitive load and determining a total net capacitive load thereof; and, apportioning said driving circuits of said split I/O circuit according to a percent of said total net capacitive load for each sink group.

* * * * *